(12) United States Patent
Bacher et al.

(10) Patent No.: US 8,585,372 B2
(45) Date of Patent: Nov. 19, 2013

(54) MOTOR/PUMP ASSEMBLY

(75) Inventors: Jens Bacher, Frankfurt am Main (DE);
Lazar Milisic, Kelkheim (DE);
Wolfgang Ritter, Oberursel/Ts. (DE);
Karlheinz Seitz, Lorsch (DE); Manfred Rüffer, Sulzbach (DE); Jose Gonzalez, Bad Oeynhausen (DE); Thomas Stahl, Hammersbach (DE); Michael Jürging, Kelkheim (DE); Yuejun Qian, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 608 days.

(21) Appl. No.: 12/677,398

(22) PCT Filed: Sep. 8, 2008

(86) PCT No.: PCT/EP2008/061836
§ 371 (c)(1),
(2), (4) Date: Mar. 10, 2010

(87) PCT Pub. No.: WO2009/034044
PCT Pub. Date: Mar. 19, 2009

(65) Prior Publication Data
US 2010/0202893 A1    Aug. 12, 2010

(30) Foreign Application Priority Data

Sep. 11, 2007  (DE) .......................... 10 2007 043 054
Jan. 24, 2008  (DE) .......................... 10 2008 005 820

(51) Int. Cl.
*F04B 39/00* (2006.01)
(52) U.S. Cl.
USPC .............. 417/312; 417/413.1; 92/82; 303/10; 303/116.4; 181/231

(58) Field of Classification Search
USPC ........ 417/312, 413.1; 92/82, 261; 303/10, 11, 303/116.4; 181/229, 230, 231
See application file for complete search history.

(56) References Cited

U.S. PATENT DOCUMENTS

| | | | | |
|---|---|---|---|---|
| 4,242,061 A | * | 12/1980 | Hartley | 417/536 |
| 4,721,444 A | * | 1/1988 | Pareja | 417/540 |
| 4,743,169 A | * | 5/1988 | Funakawa et al. | 417/306 |
| 5,252,045 A | * | 10/1993 | Shinoto et al. | 417/524 |
| 5,644,969 A | * | 7/1997 | Leu et al. | 92/60.5 |
| 5,649,809 A | * | 7/1997 | Stapelfeldt | 417/63 |

(Continued)

FOREIGN PATENT DOCUMENTS

| DE | 2 212 322 | 9/1973 |
|---|---|---|
| DE | 31 11 258 A1 | 10/1982 |

(Continued)

*Primary Examiner* — Devon Kramer
*Assistant Examiner* — Joseph Herrmann
(74) *Attorney, Agent, or Firm* — RatnerPrestia

(57) ABSTRACT

A motor/pump assembly for a motor vehicle brake system including a pump and a motor driving the pump, the pump having opposite working diaphragms which are, in each case, mounted between a pump casing and a cover and thereby delimit a space and which can be moved by a crank drive, the space being assigned, in each case, an inlet duct with an inlet valve and an outlet duct with an outlet valve. The outlet ducts are arranged in the covers and in the pump casing such that air displaced out of the spaces is conducted into an inner space surrounding the crank drive of the pump casing and that an air outlet unit be provided, which allows a low-noise blow-out of the air from the inner space as a result of the deflection of the air.

43 Claims, 9 Drawing Sheets

(56) References Cited

U.S. PATENT DOCUMENTS

| | | | | |
|---|---|---|---|---|
| 5,690,017 A | * | 11/1997 | Riedlinger | 92/100 |
| 6,129,176 A | * | 10/2000 | Hunsberger et al. | 181/202 |
| 7,117,781 B2 | * | 10/2006 | Lynn | 92/140 |
| 7,141,101 B2 | * | 11/2006 | Amann | 96/380 |
| 7,225,788 B2 | * | 6/2007 | Takano et al. | 123/198 DB |
| 7,631,725 B2 | * | 12/2009 | Towne et al. | 181/230 |
| 2010/0045096 A1 | * | 2/2010 | Schonlau et al. | 303/10 |

FOREIGN PATENT DOCUMENTS

| | | | |
|---|---|---|---|
| DE | 35 29 978 A1 | | 3/1987 |
| DE | 10 2006 060 645 A1 | | 8/2007 |
| DE | 102006060645 | * | 8/2007 |
| EP | 1 354 037 | | 5/1974 |
| EP | 0 614 009 A1 | | 9/1994 |
| GB | 2 095 330 A | | 9/1982 |
| GB | 2 310 464 | | 8/1997 |

* cited by examiner

MOTOR/PUMP ASSEMBLY

CROSS REFERENCE TO RELATED APPLICATIONS

This application is the U.S. national phase application of PCT International Application No. PCT/EP2008/061836, filed Sep. 8, 2008, which claims priority to German Application No. 10 2007 043 054.1, filed Sep. 11, 2007, and German Application No. 10 2008 005 820.3, filed Jan. 24, 2008, the contents of such applications being incorporated by reference herein.

FIELD OF THE INVENTION

The invention relates to a motor/pump assembly, in particular for the provision of pressure for a brake actuation device of a motor vehicle brake system with a pneumatic brake booster, in particular with a vacuum brake booster, comprising a pump and an electric motor driving the pump, the pump being provided as a double-diaphragm pump with two mutually opposite working diaphragms which are in each case tension-mounted between a pump casing and a working-space cover and thereby delimit a working space and which can be moved by means of a crank drive having eccentrics and connecting rods, each working space being assigned in each case an inlet duct with an inlet valve and an outlet duct with an outlet valve.

BACKGROUND OF THE INVENTION

For the provision of vacuum for a pneumatic brake booster, the inner space of which is subdivided into at least one vacuum chamber and one working chamber, vacuum pumps are employed which suck in residual air from the vacuum chamber and eject into the atmosphere. For this purpose, as a rule, vane-cell pumps or swing-vane pumps are used in the automobile industry. These have, as a consequence of the principle adopted, a large amount of friction and must be lubricated in order to achieve an acceptable service life. Vacuum pumps with vanes which are driven by the internal combustion engine of the motor vehicle are therefore connected to the oil circuit of the internal combustion engine. Nevertheless, an appreciable fraction of the power output by the internal combustion engine has to be expended in order to drive such a pump. This is true even when the vacuum is already fully formed in the chamber to be evacuated. It is therefore expedient to operate the vacuum pump with electrical energy and to switch it on only when the absolute pressure in the vacuum chamber rises above a predetermined value.

Furthermore, in vehicles with an electric or hybrid drive, the vacuum pump cannot be driven or temporarily cannot be driven by the internal combustion engine. In these vehicles, therefore, electrically driven vacuum pumps are employed.

Equipping such an electrically driven pump with a lubricant circuit or connecting it to such would entail a disproportionally high outlay. Only dry-running vacuum pumps can therefore be considered for use in motor vehicles having brake systems with an electrically driven vacuum pump. For this purpose, in vane-cell pumps, the self-lubricating material used is graphite, from which the vanes are produced with required precision at high outlay. Efforts therefore tend towards using a diaphragm pump for the electrical provision of a brake vacuum.

Diaphragm pumps are generally known. DE 35 29 978 A1, which is incorporated by reference, discloses a motor/pump assembly comprising a double-diaphragm pump with a rotating eccentric shaft which is driven by an electric motor.

The automobile industry stipulates very stringent requirements with regard to the acoustic comfort of the motor vehicle components, and robust long-life pumps with very low noise emissions are demanded from the manufacturers. On account of vibrations, the known diaphragm pumps mostly cannot fulfil these requirements or demand a high outlay in terms of sound-damping measures.

SUMMARY OF THE INVENTION

An object of the present invention is to provide a motor/pump assembly which comprises a dry-running pump and takes into account the stringent requirements with regard to acoustic comfort and to the service life. A further object of the invention is to improve the motor/pump assembly with regard to its pumping action.

The object is achieved, according to aspects of the invention, in that the outlet ducts are arranged in the working-space covers and in the pump casing in such a way that air displaced out of the working spaces is conducted into an inner space, surrounding the crank drive, of the pump casing, and in that an air outlet unit is provided, which allows a low-noise blow-out of the air from the inner space as a result of the deflection of the air. The inner space, also called the crank chamber, thus serves as a sound-damping space, since the blown-out air is not conducted directly into the atmosphere. Owing to the deflection of the air in the air outlet unit, the noise level can additionally be lowered appreciably, so that the blow-out noises are virtually avoided.

Preferably, the air outlet unit has further means for sound damping, with the result that airborne sound can be reduced when the air emerges from the inner space or from the air outlet unit.

According to an advantageous embodiment of the invention, the air outlet unit closes a perforation in a wall of the pump casing sealingly. The perforation can thus fulfil the function of a mounting window during mounting of the motor/pump assembly, with the result that mounting can be simplified considerably.

According to an advantageous development of the invention, mounting is made even easier in that the air outlet unit comprises a filter housing, a filter, an air outlet cover, an air outlet closing cap and a valve body and is provided as a premountable subassembly.

A backflow of the ejected air and the penetration of liquid or gaseous substances into the air outlet unit are preferably prevented in that the filter housing, the air outlet closing cap and the valve body form a non-return valve. Alternatively, the air outlet cover, the air outlet closing cap and the valve body may form the non-return valve.

According to an advantageous embodiment, the deflection of the air in the air outlet unit takes place in that an intermediate bottom is provided between the filter housing and the air outlet cover and deflects the air emerging from the inner space. The intermediate bottom can be integrated into the air outlet unit in a simple way and forms part of the premountable structural unit.

According to a further advantageous embodiment of the invention, the filter is arranged between the filter housing and the intermediate bottom, and a further filter is provided between the air outlet cover and the intermediate bottom. The airborne sound is thus damped both before deflection and after this in the air outlet unit.

According to an advantageous embodiment, the subassembly is formed so as to be captive in that the filter housing is riveted to the air outlet cover.

Preferably, the air outlet cover and/or the filter housing can be fastened to the wall by means of screw elements, with the result that a sealed-off fastening is made possible in a simple way.

According to an advantageous development of the invention, the two inlet ducts are connected to one another via ducts formed in the pump casing and have a common connection. A second connection is not necessary, and therefore the installation space of the motor/pump assembly can be optimized.

Preferably, an adapter is provided, which is fastened sealingly in the common connection and which has an adapter exit, the adapter exit having means for fastening a hose. As a result, the adapter can be adapted individually to the most diverse possible connection variants or customer wishes without a change in the pump casing. According to an advantageous embodiment, it is conceivable, for example, that the connection is designed as an intake pipe connection piece.

A simple mounting of the connection is obtained when the adapter can be positioned in the connection by means of a latching connection.

The adapter is in this case preferably arranged rotatably in the connection by means of an annular latching element, the latching element being latched into an undercut.

In order to obtain a motor/pump assembly for the most diverse possible installation conditions, according to an advantageous embodiment of the invention, the pump casing has two mutually opposite connections, one connection being closed. For this purpose, one of the connections may be closed sealingly by means of a plug or one of the connections remains closed during production and is opened, for example by drilling, only when required.

The pump casing may preferably be produced from plastic or from aluminium, a low weight of the motor/pump assembly being achieved if the pump casing is produced from plastic. By contrast, a pump casing made from aluminium makes it possible to have a good dissipation of heat from the motor, with the result that the service life of the motor can be prolonged.

The working-space cover may likewise be produced from plastic or from aluminium, with the result that the production of the working-space cover can be simplified.

According to an advantageous design of the invention, the working-space cover has an upper cover and a lower cover which are connected sealingly to one another, the valves being provided between the upper cover and the lower cover. The valves can thereby be mounted in a simple way.

Preferably, the upper cover is welded, riveted or screwed to the lower cover. A centering of the upper cover on the lower cover can thereby take place simultaneously without further means.

According to an advantageous embodiment of the invention, a simple production of the working-space cover is achieved in that the inlet duct is formed in the upper cover and the outlet duct is provided between the upper cover and lower cover.

An optimal utilization of the passage area of the inlet valve is preferably achieved in that the inlet duct is divided in the region of the inlet valve into a plurality of individual ducts arranged annularly about a mid-axis of the inlet valve.

Preferably, the inlet valve and the outlet valve are in each case arranged obliquely with respect to axes of symmetry of the pump, as a result of which a configuration optimized in terms of construction space is possible for the working-space cover. In this case, the valves are preferably provided as plate valves with a valve disc.

According to an advantageous embodiment of the invention, the valve discs are riveted to the upper cover and the lower cover respectively, with the result that the valve discs are fastened captively.

Preferably, working-space cover orifices assigned to the outlet valve are provided in the lower cover, the working-space cover orifices being arranged asymmetrically about a mid-axis of the outlet valve. As a result, the waste volume, as it may be referred to, can be kept as low as possible, without the passage volume of the working-space cover orifices being reduced. The asymmetric arrangement in this case brings about a noise reduction during the throughflow of air.

Preferably, a bypass duct may be provided on the outlet valve which allows a pressure reduction in the working space of the pump at a standstill. As a result, in particular, the starting resistance under cold conditions is lower, and, even if the voltage is reduced, a reliable starting of the motor/pump assembly is made possible.

According to an advantageous development of the invention, the inlet and outlet ducts are arranged in the pump casing in such a way that the two working-space covers are configured identically. It is therefore possible to configure the working-space covers identically for both sides of the pump, and there is no need to keep two different working-space covers in stock.

A centering of the crank drive inside the pump casing is advantageously achieved in that a motor shaft of the electric motor is mounted in a first bearing arranged in the motor and in a second bearing, the second bearing being received partly by a motor housing and partly by the pump casing, and in that a motor-shaft end projects into the pump casing. An additional mounting of the motor shaft in the pump casing can thereby be dispensed with.

A reduction in the individual parts is preferably achieved in that the crank drive (eccentrics and connecting rods) is arranged on the motor shaft. An additional eccentric shaft will therefore be omitted.

In order to ensure that the motor/pump assembly runs quietly, there is preferably provision for the centre points of the eccentrics to be arranged diametrically with respect to a mid-axis of the motor shaft or of the eccentric shaft. The reaction forces of the oscillating masses can thereby be virtually compensated.

For pressing into position, the eccentrics have recesses for the reception of dowel pins. Pressing-in can thereby take place exactly in position. Furthermore, it is thereby possible to press in both eccentrics in one operation.

Preferably, the connecting rods are provided in bent form, torques which arise being neutralized on account of the offset.

According to an advantageous embodiment, one or more balancing weights for vibration optimization can be attached to the eccentrics. In this case, the balancing weight is preferably screwed, welded or riveted to an eccentric.

According to an advantageous development of the motor/pump assembly according to aspects of the invention, to make it easier to mount the working-space cover, the pump casing and the working-space covers have means for the defined positioning of the working-space covers on the pump casing.

Preferably, the activation of the motor/pump assembly takes place via an electronic control unit as a function of a signal from a sensor which detects a pressure difference between the vacuum chamber and the working chamber or an absolute pressure in the vacuum chamber of the brake booster.

The connecting rods can be produced, for weight optimization, from plastic if, according to a preferred embodiment, the connecting rods have in the region of a connecting-rod eye injection-moulded supporting rings for the stabilization of ball bearings.

The supporting ring preferably has a cylindrical margin which is shaped for securing the ball bearing.

According to an advantageous embodiment of the invention, for filtering a certain frequency band, a holding element is provided which at least partially surrounds an outside of the motor by means of holding arms, a damping element being arranged between the outside and the holding element.

Preferably, a tappet is connected fixedly to the connecting rod by means of a welded or threaded connection. However, according to another advantageous embodiment of the invention, the tappet may be provided in one piece with the connecting rod.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

FIGS. 1 to 7 show an exemplary embodiment of a motor/pump assembly 101.

Figure 1:
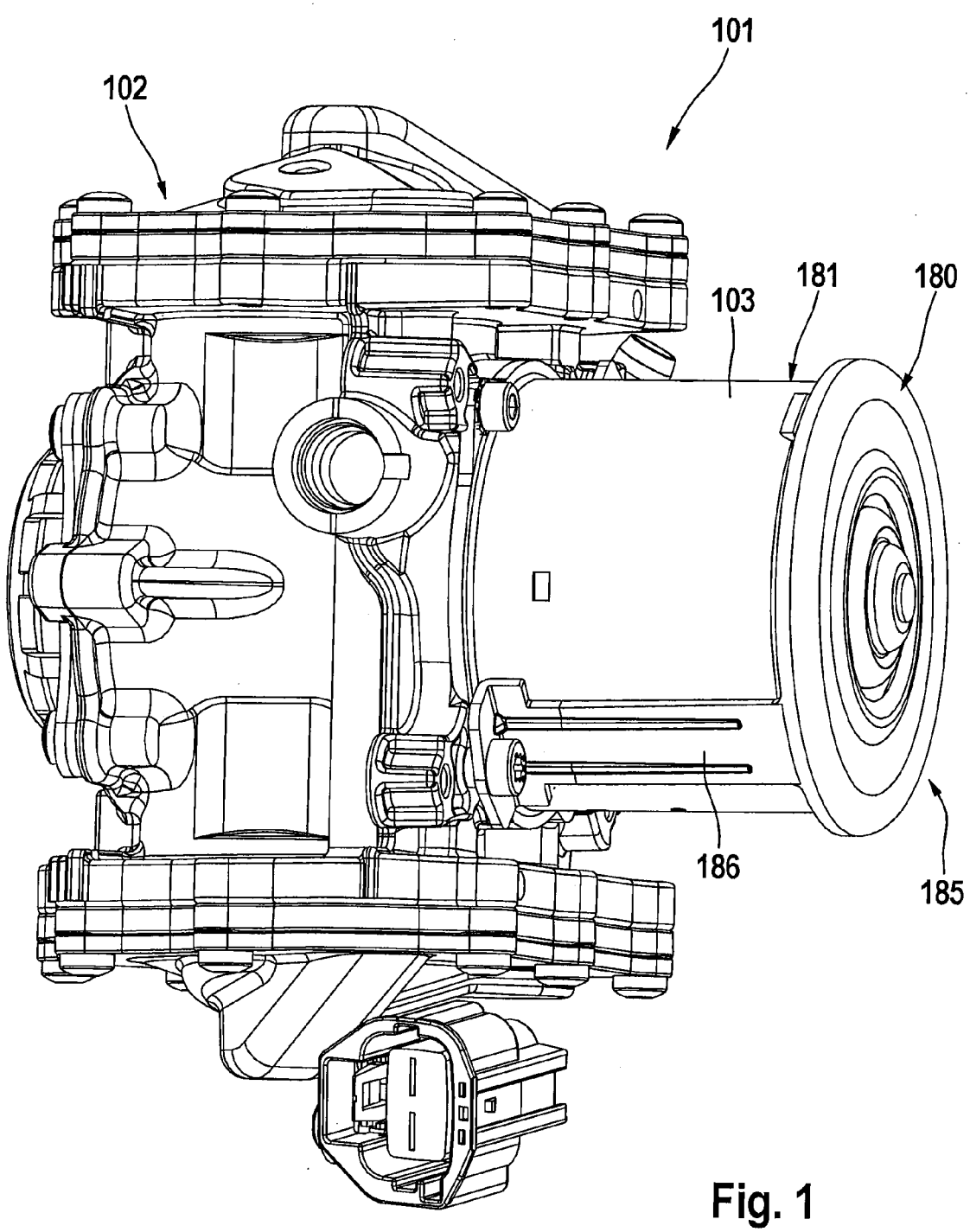
FIG. 1 shows an exemplary embodiment of a motor/pump assembly according to aspects of the invention in a three-dimensional illustration.

FIG. 1 shows the motor/pump assembly 101 in a three-dimensional illustration, which comprises a pump 102 with a pump casing 105 and an electric motor 103 driving the pump 102, in this case the motor 103 may, for example, be designed as a direct-current motor.

Figure 2:
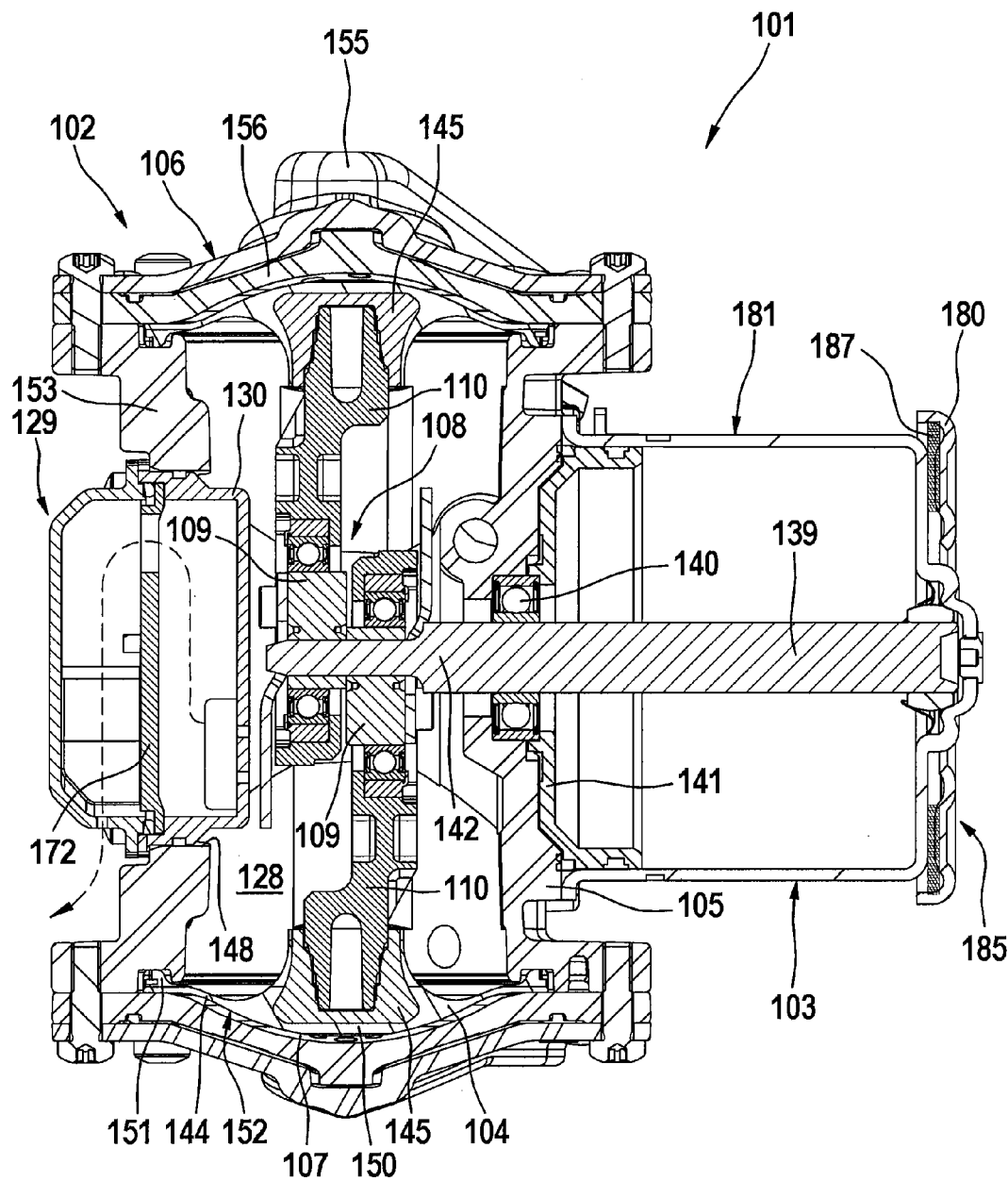
FIG. 2 shows the motor/pump assembly according to FIG. 1 in a longitudinal section through a first plane.

As can be gathered particularly from FIG. 2, which shows the motor/pump assembly 101 in a longitudinal section through a first plane, the pump 102 is provided as a double-diaphragm pump with two mutually opposite working diaphragms 104 which are tension-mounted in each case between the pump casing 105 and a working-space cover 106 and which thereby delimit a working space 107. The working diaphragms 104 can be moved contradirectionally by means of a crank drive 108 with comprises, for each working diaphragm 104, an eccentric 109 and a connecting rod 110.

Figure 7:
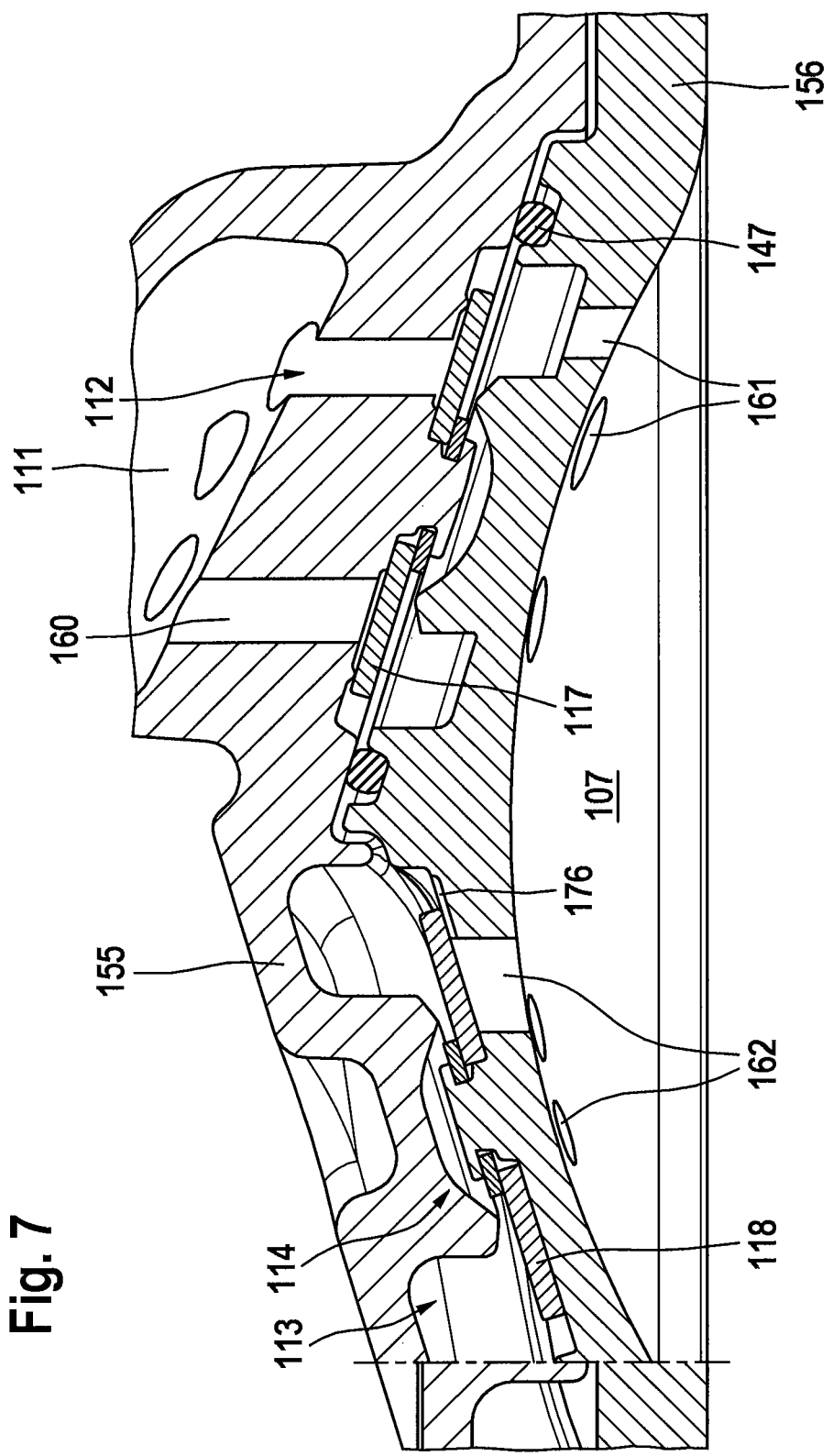
FIG. 7 shows a part-view of the motor/pump assembly according to FIG. 1 in a longitudinal section through a further plane.
Figure 8:
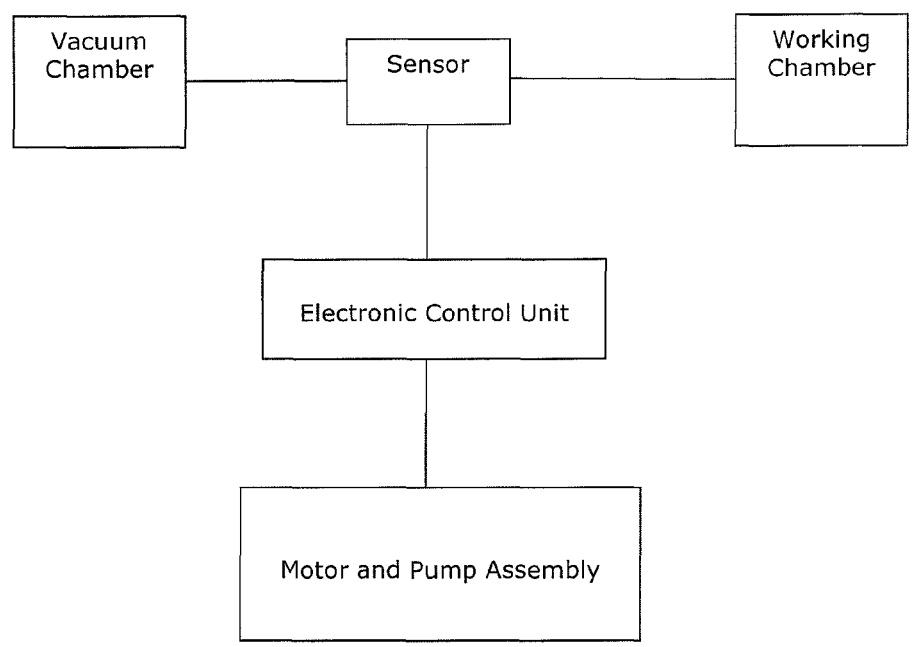
FIG. 8 shows an electronic control unit, sensor, vacuum chamber, and its relationship to the working chamber and the vacuum chamber.
Figure 9:
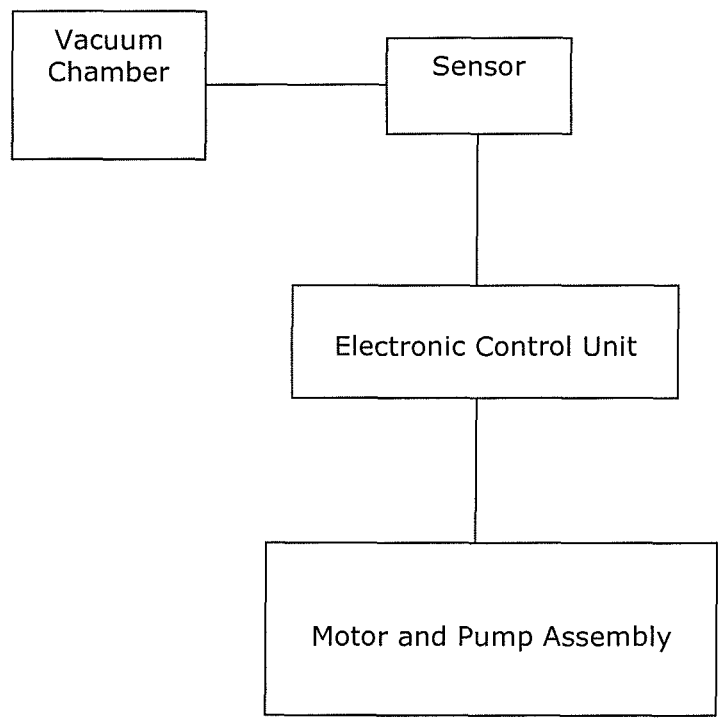
FIG. 9 shows an electronic control unit, sensor, vacuum chamber, and its relationship to the vacuum chamber.

The working-space cover 106 of the motor/pump assembly 101 is illustrated in section in FIG. 7. It is clear that the working-space cover 106 has an upper cover 155 and a lower cover 156 which, depending on the material—plastic or aluminium—, are welded, riveted or screwed, air-tight, to one another. Further features of the working-space cover 106 are listed in the following description.

Figure 3:
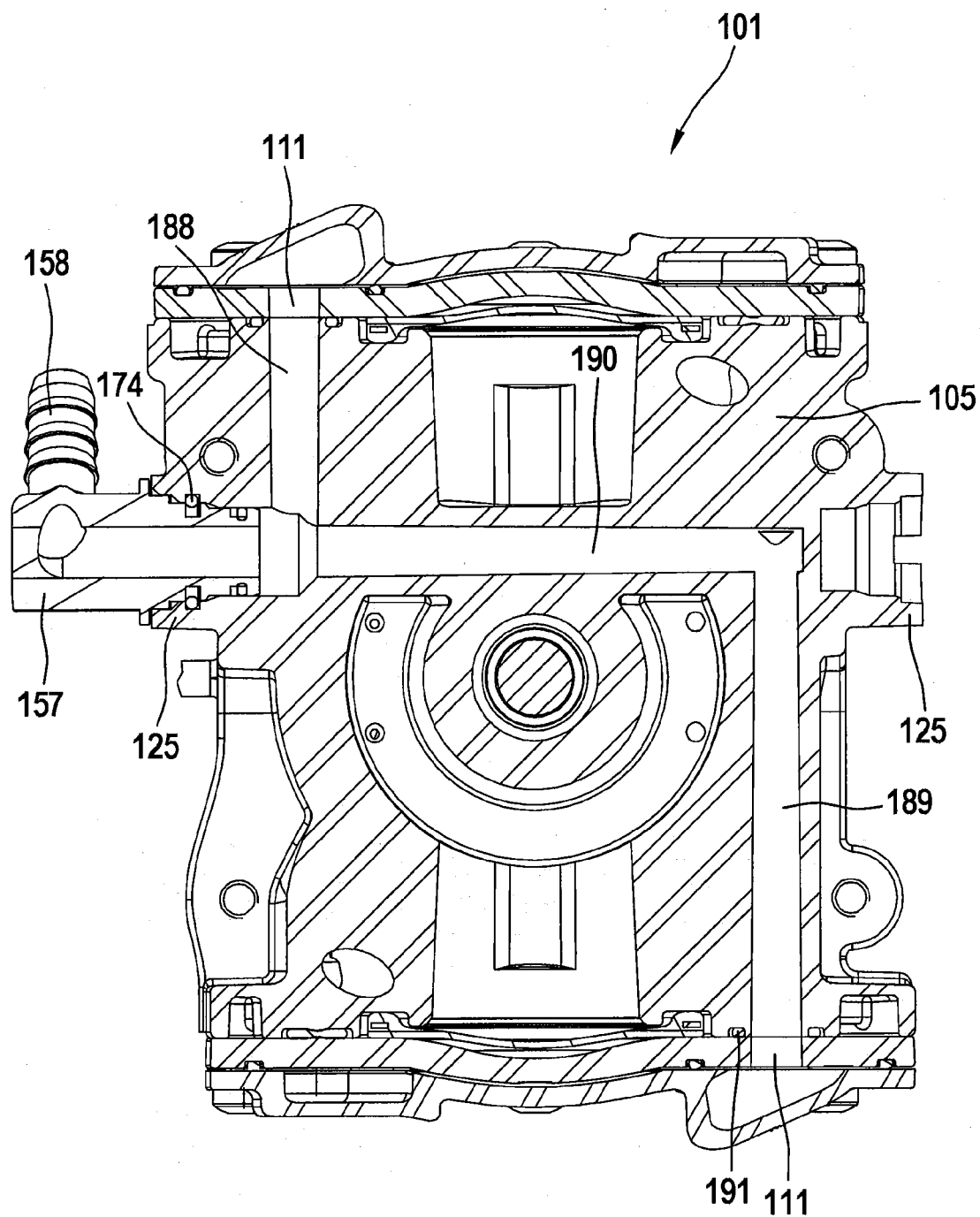
FIG. 3 shows the motor/pump assembly according to FIG. 1 in a longitudinal section through a second plane.

A connection 125, shown in FIG. 3, with an adapter 157 fastened sealingly in it, via which the connected brake booster is evacuated, is provided on the pump casing 105. The adapter 157 may, for example, have an angled design, as illustrated. However, according to the customer's wishes, a straight adapter 157 is likewise also possible. Further, the configuration of an adapter exit 158, to which a vacuum hose, not shown, is fastened, is configured differently, depending on the type of connection. Thus, in addition to the pine-tree profile illustrated, a quick-action or latching fastening may also be envisaged.

The adapter 157 can be positioned sealingly into the connection 125 by means of a latching connection.

Figure 6:
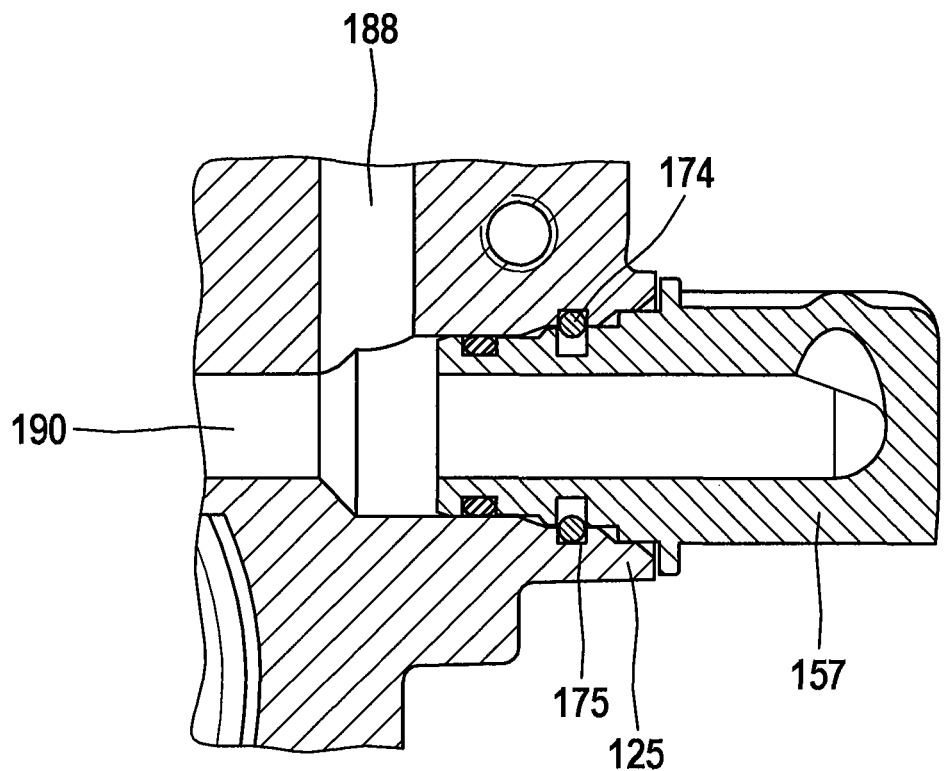
FIG. 6 shows a vacuum connection with adapter of the motore/pump assembly according to FIG. 1.

The adapter 157, which is illustrated particularly in FIG. 6, is arranged rotatably in the connection 125 by means of an annular latching element 174. The latching connection is made as a result of a latching of the latching element 174 into an undercut 175, with the result that a demounting of the adapter 157 is ruled out.

As may be gathered particularly from FIG. 3, the adapter 157 issues into a housing bore which branches into ducts 188, 189, 190 which are formed in the pump casing 105 and lead to the two working-space covers 106. It is thereby possible to configure the working-space covers 106 for both sides of the pump 102 identically, with the result that mounting is substantially simplified. Advantageously, a second connection 125 may be provided on the opposite side of the pump casing 105. It is consequently possible to connect the adapter 157 either to one side or to the opposite side, depending on the customer's wish and on the installation conditions of the motor/pump assembly 101. For this purpose, one of the connections 125 may be closed sealingly by means of a plug. It is likewise conceivable, as illustrated, to leave one of the connections 125 closed during production and to open it, for example by drilling, only when required.

In each of the working-space covers 106, an inlet duct 111 is provided which is formed in the upper cover 155 and which is connected, air-tight, to the ducts 190 and 188 or 189 by means of a sealing element and transfers the sucked-in air to an inlet valve 112. The inlet valve 112 is preferably designed as a plate valve with a valve disc 117 made from elastic material. The overall passage area to be covered by the elastomeric valve disc 117 is in this case expediently divided into a plurality of small passage areas each of circular cross section. For this purpose, the inlet duct 111 branches in the upper cover 155 into a corresponding number of individual ducts 160 which are arranged annularly about a mid-axis of the inlet valve 112. The passage area of the inlet valve 112 is consequently utilized.

After flowing through the inlet valve 112, the sucked-in air passes, via working-space cover orifices 161 in the lower cover 156, into the working space 107 between the diaphragms 104 and working-space covers 106, is compressed there and is routed, via further working-space cover orifices 162, to the outlet valve 114 which is likewise designed as a plate valve with a valve disc 118 made from elastomeric material. As is clear, an outlet duct 113 is formed between the upper cover 155 and lower cover 156.

In order to obtain the working space 107 having a very small residual volume, the working-space cover 106 also has, in this exemplary embodiment, a three-dimensional shape which is adapted to the envelope of a working-space-side diaphragm surface 152 which is induced as a result of the tilting movement of a tappet 145 moved by the crank drive 108. Preferably, the adaptation of the three-dimensional working-space cover inner contour to the envelope takes place in that a predetermined short distance is maintained between the regions of a low-deformability portion 150 of the working diaphragm 104 and the working-space cover 106, while the selected distance in the regions of a high-deformability portion 144 of the working diaphragm 104 and a diaphragm bead 151 tends to zero. The short distance of the working-space cover inner contour from the envelope of a working-space-side diaphragm surface 152 in the central region of the diaphragm 104 prevents its impact against the working-space cover 106 when the pump 102 is in operation, and also makes it possible, at the top dead centre of the crank drive 108, to have an air flow between the working space 107 and the working-space cover orifices 161, 162.

The working-space cover orifices 161, 162 belong to what may be referred to as the waste volume, that is to say the residual volume left behind during expulsion. The air under atmospheric pressure which remains in it expands during the intake process, with the result that less volume can be sucked in. It is therefore expedient to configure the working-space cover orifices 161, 162 with as small a volume as possible.

The inlet and outlet valve 112, 114 are therefore arranged tangentially with respect to the working-space cover inner contour, that is to say obliquely with respect to the planes of symmetry of the pump 102, and the working-space cover orifices 161, 162 are designed as short bores. This configuration of the working-space covers 106 occupies a small construction space, this being a further advantage.

The expelled air is conducted from the outlet valve 114 via the outlet duct 113 in the working-space cover 106 to an outlet duct, not illustrated, in the pump casing 105. The outlet ducts 113 in the working-space cover 106 and pump casing 105 are connected, air-tight, by means of a sealing element. The two outlet ducts in the pump casing 105 issue into an inner space 128 of the pump casing 105, what is known as the crank chamber, which surrounds the crank drive 108.

The valve discs 117, 118 may be riveted to the upper cover 155 and the lower cover 156 respectively, with the result that the valve discs 117, 118 are fastened captively. Alternatively, however, the valve discs 117, 118 may also be introduced only before mounting.

As is clear from FIG. 7, the working-space cover orifices 162 provided in the lower cover 156 are arranged asymmetrically about a mid-axis of the outlet valve 114 for noise reduction, with the result that a reduction in noise can be brought about when the air flows through.

Furthermore, at the outlet valve 114, a bypass duct 176 may be provided, which serves for the reduction of pressure in a working space 107 of the pump 102 at a standstill. As a result, particularly under cold conditions, a lower starting resistance can be achieved, and, even if the voltage is reduced, a reliable starting is made possible.

Figure 4:
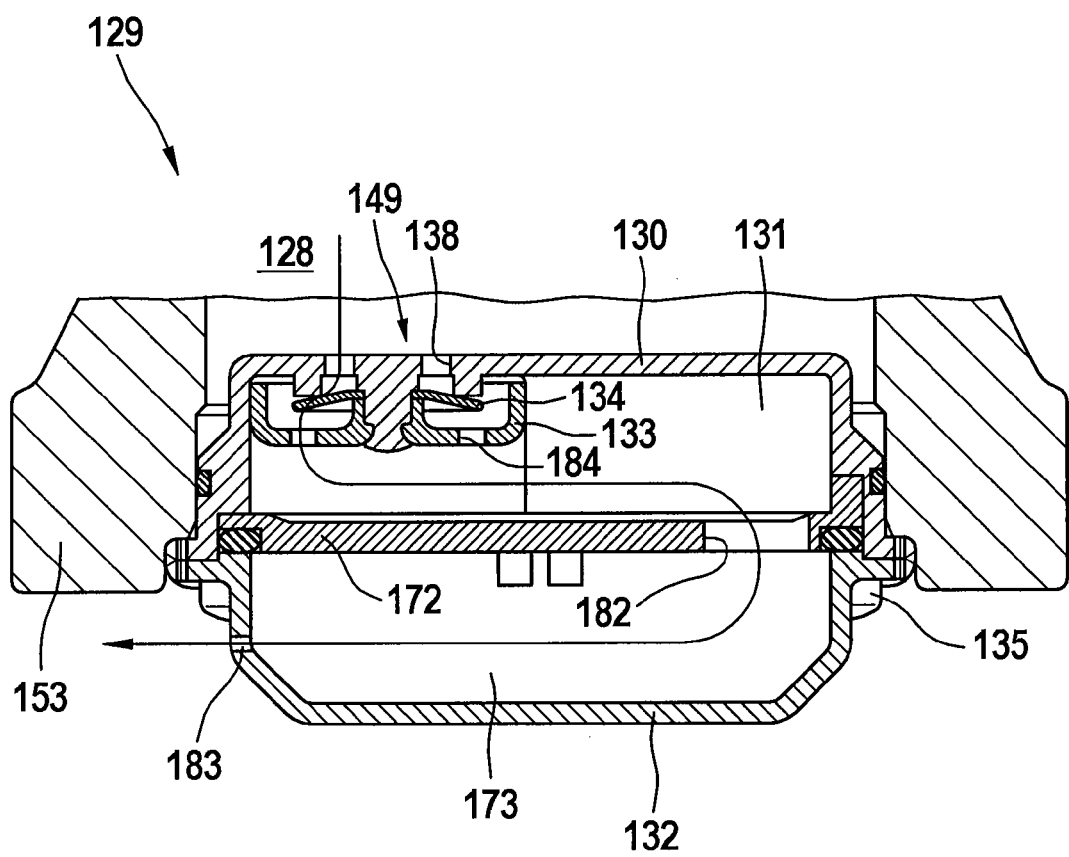
FIG. 4 shows an air outlet unit of the motor/pump assembly according to FIG. 1.

An air outlet unit 129, provided in the pump casing 105 and illustrated, enlarged, in FIG. 4, makes it possible to have a low-noise blow-out of the air from the inner space 128. The inner space 128 thus serves as a sound-damping space. The air outlet unit 129 comprises a non-return valve 149 comprising a one-part or multi-part valve body 134 which prevents a back flow of already ejected air and the penetration of liquid or gaseous substances into the crank chamber 128.

In addition, when the air emerges from the inner space 128, the airborne sound is reduced in that the air outlet unit 129 has a filter 131 arranged in a filter housing 130. Further, the air outlet unit 129 comprises an air outlet cover 132, an air outlet closing cap 133 and the valve body 134 and may be provided as a premountable subassembly. The air outlet cover 132 and the filter housing 130 are fastened by means of screw elements 135.

The filter housing 130 is riveted to the air outlet cover 132.

As is clear in FIG. 4, the deflection of the air in the air outlet unit takes place in that an intermediate bottom 172 is provided between the filter housing 130 and the air outlet cover 132 and deflects the air emerging from the inner space 128. The intermediate bottom 172 can be integrated in a simple way into the air outlet unit 129 and forms part of the premountable structural unit.

The filter 131 is arranged between the filter housing 130 and the intermediate bottom 172. A further filter 173 is provided between the air outlet cover 132 and the intermediate bottom 172. The airborne sound is thus damped both before deflection and also after this in the air outlet unit 129.

If the air pressure in the inner space 128 of the pump becomes higher than the atmospheric pressure surrounding the pump, the non-return valve 149 opens, in that the valve body 134 lifts off at least partially from through-bores 138 in the air outlet cover 132, and the air flows through through-bores 184 in the air outlet closing cap 133 and through the filter 131 in the direction of the atmosphere.

For this purpose, the intermediate bottom 172 has a passageway 182. The air first passes through the through-bores 138 of the filter housing 130 and the through-bores 184 of the air outlet closing cap 133. The passageway 182 of the intermediate bottom 172 is positioned in such a way that the air is deflected first through 90° and then through 180° until it emerges from an orifice 183 of the air outlet cover 132. As a result of this air deflection, the noise level can be appreciably lowered.

Thus, on the one hand, the pressure in the inner space 128 of the pump 102 can rise above the atmospheric pressure only by the amount of the small differential pressure value necessary for opening the non-return valve 149 and, on the other hand, the pressure in the inner space 128 is subjected to periodic fluctuations in time with the change in the volume of the inner space which accompanies the crank movement. This gives rise to a time-averaged inner-space pressure below the atmospheric pressure.

It may be gathered, further, from FIG. 2 that a motor shaft 139 of the electric motor 103 is mounted in a first bearing, not illustrated, arranged in the motor 3 and in a second bearing 140, the second bearing 140 being received partly by a motor housing 141 and partially by the pump casing 105. A motor-shaft end 142 projects into the pump casing 105, as a result of which an additional mounting of the motor shaft 139 in the pump casing 105 may be dispensed with.

An advantageous centering of the crank drive 108 inside the pump casing 105 is thereby achieved. The fastening of the motor 103 to the pump casing 105 takes place by means of screw elements, not shown, which engage into threaded inserts introduced in the pump casing 105, if the pump casing 105 is formed from plastic.

In this exemplary embodiment, the motor shaft 139 serves at the same time as an eccentric shaft which carries the crank drive 108 with the eccentrics 109 and with the connecting rods 110. However, a separate version of a motor shaft 139 and an eccentric shaft is also possible.

In order to ensure that the motor/pump assembly 101 runs quietly, the centre points of the eccentrics 109 are arranged diametrically and at the same distance with respect to a mid-axis of the motor shaft 139, that is to say the eccentrics 109 are offset at 180°. As a result, the reaction forces of the oscillating masses of the working diaphragms 104, connecting rods 110 and eccentrics 109 can be virtually compensated, since, in any phase of their movement, the common centre of gravity remains at least approximately at rest. The remaining minor deviation from an ideal mass compensation is due to the fact that, as illustrated in FIG. 2, the two eccentrics 109 are arranged offset axially, while the working diaphragms 104 move at the same axial height.

It may be gathered, further, from FIG. 2 that the working diaphragm 104 separates the working space 107 from the crank chamber 128 and is connected fixedly to the tappet 145, and in this case the preferably non-deformable tappet 145 may be injection-moulded around with the elastically deformable material of the working diaphragm 104. This gives rise, in the vicinity of the tappet 145, to the already mentioned low-deformability portion 150 in the centre of the working diaphragm 104, which portion merges outwards into the high-deformability portion 144 of the working diaphragm 104, this, in turn, merging outwards into a diaphragm bead 151 which is connected fixedly, air-tight, to the pump casing 105. The tappet 145 may be connected fixedly to the connecting rod 110 by means of either a welded or a threaded connection. It may, however, also be provided in one piece with the connecting rod 110. The connecting rods 110 are mounted movably on the eccentrics 109 by means of ball bearings 146.

If the connecting rods 110 provided are made from plastic, injection-moulded supporting rings 169 in the region of a connecting-rod eye 171 can stabilize the seat of the ball bearings 146 in the connecting rods 110.

The connecting rods 110 may be produced, for weight optimization, from plastic if, according to a preferred embodiment, the connecting rods 110 have, in the region of a connecting-rod eye 171, injection-moulded supporting rings 169 for the stabilization of ball bearings 146. The supporting ring 169 in this case has a cylindrical margin 179 which is shaped for securing the ball bearing 146.

A weight-optimized assembly 101 is obtained in that the pump casing 105 and the working-space covers 106 are produced from plastic, for example by means of injection moulding, individual parts produced by injection moulding preferably being connected to one another by means of ultrasonic welding. Furthermore, the pump casing 105 and the working-space cover 106 or only the pump casing 105 may be produced from aluminium, since aluminium allows good dissipation of heat from the motor 103. A material combination of plastic and of aluminium may therefore be envisaged for the two parts.

Advantageously, the inlet and outlet ducts 111, 113 in the pump casing 105 are positioned in such a way that the two working-space covers 106 can be configured identically. In this case, the working-space covers 106 and the pump casing 105 have means for the defined positioning of the working-space covers 106 on the pump casing 105, in order to make mounting easier and to rule out incorrect positioning.

To embody the means for defined positioning, an asymmetric joining contour and also projections in the connection surface may be provided. If the working-space cover 106 and pump casing 105 are connected by means of screws, an asymmetric hole pattern is appropriate as positioning means.

Flow ducts which penetrate through the connection surface between the working-space cover 106 and pump casing 105 are formed, gas-tight with respect to their surroundings, at the transitions between the working-space cover 106 and pump casing 105, for example using sealing elements 191 shown in FIG. 3, by means of gas-tight welding. Furthermore, seals 147 are provided between the upper and lower cover 155, 156, as is evident from FIG. 7.

The above-described air outlet unit 129, consisting essentially of the filter housing 130, filters 131, 173, air outlet cover 132, valve closing cap 133, intermediate bottom 172 and valve body 134, is designed as a premountable unit and is provided for installation into a perforation 148 of a wall 153, facing away from the motor 103, of the pump casing 105. In this case, the perforation 148, before the insertion of the air outlet unit 129, fulfils the function of a mounting window which allows access to the inner space 128 of the pump casing 105.

The outlet ducts 113 issue into the inner space 128 of the pump casing 105, so that the latter serves as an acoustic damping chamber for mitigating the outlet sound during the expulsion of air from the working spaces 107.

Figure 5:
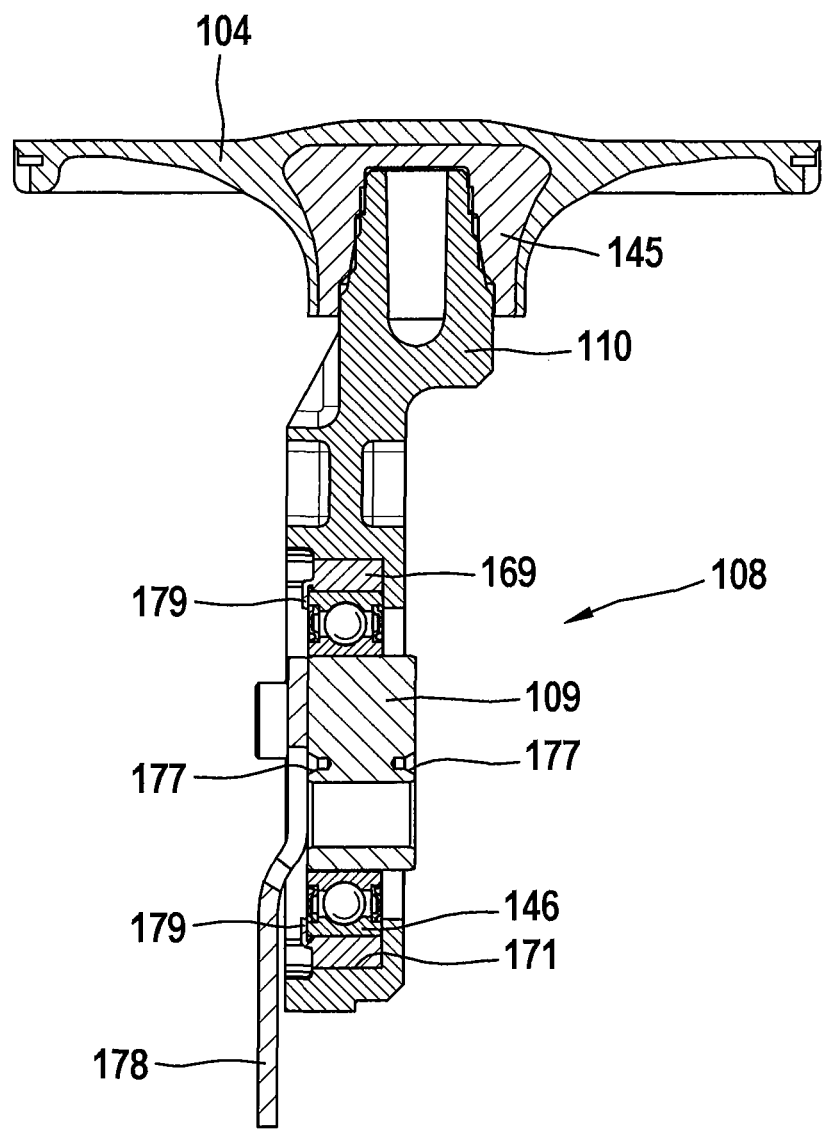
FIG. 5 shows a crank drive with a working diaphragm of the motor/pump assembly according to FIG. 1.

As shown particularly in FIG. 5, the connecting rod 110 is provided in bent form, thus resulting in a neutralization of the torque occurring on account of the connecting-rod offset. An optimization of the vibration behaviour of the pump 102 is thereby achieved. The connecting rod 109 is provided to be made from plastic, so that the complex geometry can be produced in a simple way. Further, the working diaphragm 104 and the connecting rod 110 can be friction-welded to size without complicated reworking and adaptation.

For the positioning of the eccentrics 109, these have recesses 177 which serve for the reception of dowel pins. The two eccentrics 109 can thus be mounted onto the motor shaft 139 in an exact position and be pressed in one operation.

Furthermore, one or more balancing weights 178, which serve for vibration optimization, may be fastened to the eccentric 109 by screwing, welding or riveting.

For the filtration of specific noise frequencies, a holding element 180 is provided, which is illustrated in FIG. 1 and FIG. 2. This bears, with a damping element 187 interposed, against one end face 185 of the motor 103 and at least partially surrounds an outside 181 of the motor 103 by means of a plurality of holding arms 186 which serve for fastening the holding element 180.

The activation of the motor/pump assemblies 101 described with regard to the exemplary embodiments takes place by means of an electronic control unit (ECU), not shown, as a function of a signal from a sensor which detects a pressure difference between the vacuum chamber and a working chamber or the absolute pressure in the vacuum chamber of the brake booster. In this case, the motor/pump assembly 101 is switched on when the signal undershoots a first specific lower value and is switched off when the signal overshoots a second specific upper value. The control unit may be integrated into an electronic control unit ECU, for example that of the brake system, or be provided as a separate control unit.

In order, even in the event of a failure of parts of the activation, such as, for example, of the electronic control unit, to ensure the evacuation, necessary for achieving brake boosting, of the vacuum chamber of the vacuum brake booster, there is provision for designing the activation such that the motor/pump assembly 101 becomes fully live when the vehicle is activated ("ignition on") and the electronic control unit is inactive.

The motor/pump assemblies 101 according to aspects of the invention are applied, in particular, in motor vehicles with a vacuum brake booster and replace the hitherto conventional vacuum supply by means of a suction vacuum or a vacuum pump driven by the internal combustion engine. This technology change is due to the following facts (A)-(E):

(A) Modern internal combustion engines can deliver less or no suction vacuum because the developers of internal combustion engines endeavour to reduce throttle losses and therefore lower the vacuum height, and because the secondary air introduced into the intake tract via the vacuum connection disrupts the exhaust gas control of the internal combustion engine.

(B) The internal combustion engines with direct injection, which are in increasingly widespread use, do not generate any vacuum as a consequence of the principle adopted and are therefore equipped in the prior art with vacuum pumps driven directly by the internal combustion engine, these mostly being connected to a cam shaft.

(C) A vacuum pump directly driven by the internal combustion engine causes a permanent power loss as long as the internal combustion engine is running, even when the vacuum has already reached the required height. It is more beneficial in energy terms to drive a vacuum pump electrically and to switch it off when the desired vacuum level is reached.

(D) In hybrid vehicles with an electric motor and with an internal combustion engine, operating states arise in which the internal combustion engine is inactive and does not deliver any vacuum for the brake booster and therefore a motor/pump assembly 1 is required.

(E) In straightforward electric vehicles, the only energy source available for generating a vacuum is electrical energy.

The above-described motor/pump assemblies 101 according to aspects of the invention are not restricted to the application described where a vacuum is provided. Assemblies 101 of this type can be used wherever gases are to be brought from a first pressure level to a higher second pressure level with high efficiency and with low noise emissions. For example, an application of the assembly 101 according to aspects of the invention as a compressor may also be envisaged, in which case the installation direction of the valves is preferably reversed in this application, so that the intake of the air takes place from the inner space 128 of the pump casing 105 and the discharge of compressed air takes place via the connection 125.

The invention claimed is:

1. A motor and pump assembly comprising:
a pump and an electric motor driving the pump, the pump being provided as a double-diaphragm pump with two mutually opposite working diaphragms which are, in each case, tension-mounted between a pump casing and a working-space cover and thereby delimit a working space and which can be moved by a crank drive having eccentrics and connecting rods,
said working space being assigned, in each case, an inlet duct with an inlet valve and an outlet duct with an outlet valve, wherein the outlet ducts are arranged in the working-space covers and in the pump casing in such a way that air displaced out of the working spaces is conducted into an inner space that surrounds the crank drive of the pump casing along an airflow path, and
an air outlet unit, comprising a filter housing, a filter, an air outlet cover, an air outlet closing cap, a valve body and an intermediate bottom, is provided that is configured to allow a low-noise blow-out of air from the inner space as a result of a deflection of the air,
wherein the intermediate bottom comprises a passageway there-through, and
wherein the airflow path exits at the air outlet unit, the airflow path entering the air outlet unit at a through-bore through the air outlet closing cap at a first side of the air outlet unit and passing through the passageway in the intermediate bottom at a second side of the air outlet unit, the first side opposing the second side, and after the passageway, the airflow path being redirected back toward an orifice at the first side of the air outlet unit.

2. The motor and pump assembly according to claim 1, wherein the air outlet unit has further means for sound damping.

3. The motor and pump assembly according to claim 1, wherein the air outlet unit sealingly closes a perforation in a wall of the pump casing.

4. The motor and pump assembly according to claim 3, wherein the air outlet unit is provided as a premountable subassembly.

5. The motor and pump assembly according to claim 4, wherein the filter housing, the air outlet closing cap and the valve body form a non-return valve.

6. The motor and pump assembly according to claim 5, wherein the intermediate bottom is provided apart from and between the air outlet closing cap and the air outlet cover and deflects the air emerging from the inner space.

7. The motor and pump assembly according to claim 6, wherein the filter is arranged between the filter housing and the intermediate bottom, and a further filter is provided between the air outlet cover and the intermediate bottom.

8. The motor and pump assembly according to claim 5, wherein the filter housing is riveted to the air outlet cover.

9. The motor and pump assembly according to claim 4, wherein the air outlet cover and/or the filter housing can be fastened to the wall by screw elements.

10. The motor and pump assembly according to claim 1, wherein the two inlet ducts are connected to one another via ducts formed in the pump casing and have a common connection.

11. The motor and pump assembly according to claim 10 further comprising an adapter that is fastened sealingly in the common connection and which has an adapter exit, the adapter exit having means for fastening a hose.

12. The motor and pump assembly according to claim 11, wherein the adapter can be positioned in the connection by a latching connection.

13. The motor and pump assembly according to claim 12, wherein the adapter is arranged rotatably in the connection by an annular latching element, the annular latching element being latched into an undercut.

14. The motor and pump assembly according to claim 10, wherein the pump casing has two mutually opposite connections, one connection being closed.

15. The motor and pump assembly according to claim 1, wherein the pump casing is composed of either plastic or aluminium.

16. The motor and pump assembly according to claim 1, wherein the working-space cover is composed of either plastic or aluminium.

17. The motor and pump assembly according claim 1, wherein the working-space cover has an upper cover and a lower cover which are sealingly connected to one another, the inlet valve and the outlet valve are provided between the upper cover and lower cover.

18. The motor and pump assembly according to claim 17, wherein the upper cover is welded, riveted or screwed to the lower cover.

19. The motor and pump assembly according to claim 18, wherein the inlet duct is formed in the upper cover, and the outlet duct is provided between the upper cover and the lower cover.

20. The motor and pump assembly according to claim 19, wherein the inlet duct is divided in a region of the inlet valve into a plurality of individual ducts arranged annularly about a mid-axis of the inlet valve.

21. The motor and pump assembly according to claim 19, wherein the inlet valve and the outlet valve are, in each case, arranged obliquely with respect to an axis of symmetry of the pump.

22. The motor and pump assembly according to claim 21, wherein the inlet valve and the outlet valve are provided as plate valves with a valve disc.

23. The motor and pump assembly according to claim 22, wherein the valve discs are riveted to the upper cover and the lower cover respectively.

24. The motor and pump assembly according to claim 22, wherein working-space cover orifices assigned to the outlet valve are provided in the lower cover, the working-space cover orifices being arranged asymmetrically about a mid-axis of the outlet valve.

25. The motor and pump assembly according to claim 22, wherein a bypass duct is provided on the outlet valve.

26. The motor and pump assembly according to claim 17, wherein the inlet and outlet ducts are arranged in the pump casing in such a way that the two working-space covers are configured identically.

27. The motor and pump assembly according to claim 1, wherein a motor shaft of the electric motor is mounted in a first bearing arranged in the motor and in a second bearing, the second bearing being received partly by a motor housing and partly by the pump casing, and wherein a motor-shaft end projects into the pump casing.

28. The motor and pump assembly according to claim 27, wherein the crank drive is arranged on the motor shaft.

29. The motor and pump assembly according to claim 28, wherein center points of the eccentrics are arranged diametrically with respect to a mid-axis of the motor shaft or a mid-axis of the connecting rods.

30. The motor and pump assembly according to claim 1, wherein the eccentrics have recesses for the reception of dowel pins.

31. The motor and pump assembly according to claim 1, wherein the connecting rods are bent.

32. The motor and pump assembly according to claim 1, wherein one or more balancing weights for vibration optimization can be attached to the eccentrics.

33. The motor and pump assembly according to claim 32, wherein the one or more balancing weights are screwed, welded or riveted to an eccentric.

34. The motor and pump assembly according to claim 1, wherein the pump casing and the working-space covers have means for the defined positioning of the working-space covers on the pump casing.

35. The motor and pump assembly according to claim 1, wherein activation of the motor and pump assembly takes place via an electronic control unit as a function of a signal from a sensor which detects a pressure difference between a vacuum chamber and the working chamber or an absolute pressure in the vacuum chamber of a brake booster.

36. The motor and pump assembly according to claim 1, wherein the connecting rods have, in a region of a connecting-rod eye, injection-moulded supporting rings for stabilizing ball bearings.

37. The motor and pump assembly according to claim 36, wherein a supporting ring has a cylindrical margin which is shaped for securing the ball bearing.

38. The motor and pump assembly according to claim 1 further comprising:
 a holding element, which at least partially surrounds an outside of the motor by holding arms, and
 a damping element arranged between the outside of the motor and the holding element.

39. The motor and pump assembly according to claim 1, wherein a tappet is connected fixedly to the connecting rod by a welded connection or a threaded connection.

40. The motor and pump assembly according to claim 1, wherein a tappet is provided in one piece with the connecting rod.

41. The motor and pump assembly according to claim 1, wherein the motor and pump assembly is configured to provide pressure to a brake actuation device of a motor vehicle brake system with a pneumatic brake booster.

42. The motor and pump assembly according to claim 41, wherein the pneumatic brake booster is a vacuum brake booster.

43. A motor vehicle brake system, wherein the motor vehicle brake system comprises a motor and pump assembly according to claim 1.

* * * * *